United States Patent [19]

Koshida et al.

[11] Patent Number: 4,950,875

[45] Date of Patent: Aug. 21, 1990

[54] APPARATUS FOR PROCESSING EMBOSSED CARDS

[75] Inventors: Yoshinori Koshida; Minoru Isobe, both of Tokyo, Japan

[73] Assignee: Oki Electric Industry Co., Ltd., Tokyo, Japan

[21] Appl. No.: 147,737

[22] Filed: Jan. 25, 1988

[30] Foreign Application Priority Data

| Jan. 23, 1987 | [JP] | Japan | 62-13672 |
| Jan. 23, 1987 | [JP] | Japan | 62-13673 |
| Oct. 8, 1987 | [JP] | Japan | 62-252473 |

[51] Int. Cl.⁵ ............................................. G06K 7/04
[52] U.S. Cl. ................................. 235/448; 235/444; 235/432
[58] Field of Search .................... 235/444, 448, 432

[56] References Cited

U.S. PATENT DOCUMENTS 3,612,833 10/1971 Davis .
3,671,717  6/1972 Bieser .
3,671,720  6/1972 White et al. ............... 235/448 X

FOREIGN PATENT DOCUMENTS

257995 11/1967 Fed. Rep. of Germany .
2833979  7/1979 Fed. Rep. of Germany .
29102257 10/1979 Fed. Rep. of Germany .
3445734  7/1985 Fed. Rep. of Germany .
 102534 12/1973 Japan .

Primary Examiner—David L. Trafton
Attorney, Agent, or Firm—Spencer & Frank

[57] ABSTRACT

In an apparatus for processing embossed characters on an embossed card, a sensing head has sensing wires extending generally parallel with each other in a first direction, the tips of the sensing wires disposed at different positions along a second direction orthogonal to the first direction. The sensing wires are repeatedly actuated toward their tips. Advancement of each sensing wire exceeding a predetermined distance is detected and electrical signals indicating the results of detection are produced. The embossed card is moved relative to the sensing head in a third direction orthogonal to the first and second directions, with the surface of the embossed card held parallel with the second and third directions, and close to the tips of the sensing wires. The sensing wire is repeatedly actuated toward the embossed card so that the tip of each sensing wire hits or does not hit the surface of the embossed card before exceeding the predetermined distance depending on whether or not the sensing wire is confronting an embossment or not.

12 Claims, 5 Drawing Sheets

APPARATUS FOR PROCESSING EMBOSSED CARDS

BACKGROUND OF THE INVENTION

This invention relates to a method and apparatus for processing embossed cards such as bank cards, medical examination cards, and the like on which characters are embossed, and more particularly, a method and system in the embossed card processing system for reading the embossment on the card.

Embossed cards generally made of plastic material, such as bank cards, medical examination cards, membership cards, and the like on Which characters (letters, marks, and the like) recorded in the form of the embossment have been widely known.

Data recorded on such embossed cards include a personal name, a registration number, birth date and sex. These data may be used for example to identify the person who holds the card. For example, at a hospital, a patient is required to submit an examination card when he visits the hospital for consultation and When he submits the card the clerk at the hospital transfers the data onto a slip or the like.

Embossed cards are also used in financial institutions such as banks. For instance, a customer to a bank may bring with him an embossed bank card and insert it into an automatic teller's machine (ATM). The card is then processed. The embossed characters are transferred on a recording slip or journal for confirming the use of the bank card for the transaction.

If the slips used for these operations are formed of a pressure sensitive paper, such transfer can be effected by placing the slip on the embossment and applying pressure by means of a roller, for example. This method of transfer eliminates the need of transfer by handwriting or by manipulation of a keyboard which is inherently associated with the risk of clerical errors.

However, once the information has been transferred from the card onto a slip, the card is returned to the patient or customer and further transfer of the information to other papers such as accounting sheet had to be effected by handwriting or by use of a keyboard. This is time-consuming and is susceptible to errors. Moreover, the information thus transferred by use of a pressure sensitive paper cannot readily be used for further processing and does not facilitate further reliable reproduction.

Furthermore, in automatic processing machines such as an ATM of the prior art, many components are disposed along the card transport path Such components include a magnetic strip reader/writer for reading and writing record information from or onto a magnetic strip on the embossed card, a slip container unit containing receipts and journals, an imprinting mechanism consisting of a pressure roller, a printing mechanism comprising a printing head, a cutter mechanism for cutting the receipt into slips, and a journal wind-up mechanism for winding up the journal that has been printed.

To couple the embossed card processing system having various components described above, particularly the imprinting mechanism and a space for accommodating slips which are relatively large, with the card insertion opening on a customer receiving panel near which are provided various parts or components, such as a display unit, keys, a cash insertion/dispensing opening, a bank note insertion/dispensing opening, the embossed card transport path necessarily becomes long. This increases the size and cost of the apparatus.

SUMMARY OF THE INVENTION

An object of the invention is to enable conversion of embossed characters into electrical signals thereby to permit further processing and reproduction of information.

Another object of the invention is to enable conversion of embossed characters into digital code thereby permitting the exchange of data with other data processing devices.

A further object of the invention is to enable an accurate reading of embossed characters even when the embossed card has print or smears on its surface.

A still further object of the invention is to eliminate the need of an operation circuit by employment of direct transfer of data to a printing unit thereby reducing the complexity, the size and the production cost of the apparatus.

According to one aspect of the invention, there is provided a method of processing embossed characters on an embossed card comprising the steps of:

providing a sensing head having sensing wires extending generally parallel with each other in a first direction, the tips of said sensing wires disposed at different positions along a second direction orthogonal to said first direction, means repeatedly actuating said sensing wires toward their tips, and means detecting advancement of each sensing wire exceeding a predetermined distance, and producing electrical signals indicating the results of detection, and causing relative movement between the sensing head and the embossed card in a third direction orthogonal to said first and second directions, with the surface of the embossed card held parallel with said second and third directions, and close to the tips of said sensing wires, and repeatedly actuating said sensing wire toward said embossed card so that the tip of each sensing wire hits or does not hit the surface of the embossed card before exceeding said predetermined distance depending on whether or not the sensing wire is confronting an embossment or not, the collection of the electrical signals produced by said detecting means forming an image signals representing the embossments.

According to another aspect of the invention, there is provided apparatus for processing embossed characters on an embossed card comprising a sensing head having sensing wires extending generally parallel With each other in a first direction, the tips of said sensing Wires disposed at different positions along a second direction orthogonal to said first direction, means repeatedly actuating said sensing wires toward their tips, means detecting advancement of each sensing wire exceeding a predetermined distance, and producing an electrical signal indicating the result of detection, and means for causing relative movement between the sensing head and the embossed card in a third direction orthogonal to said first and second directions, with the surface of the embossed card held parallel with said second and third directions, and close to the tips of said sensing wires, such that the tip of each sensing wire hits or does not hit the surface of the embossed card before exceeding said predetermined distance depending on whether or not the sensing wire is confronting an embossment or not, the collection of the electrical signals produced by said detecting means forming an image signals representing the embossments

DESCRIPTION OF THE PREFERRED EMBODIMENTS

An embodiment of an embossed card processing apparatus according to this invention Will now be described With reference to the accompanying drawings.

Figure 1:
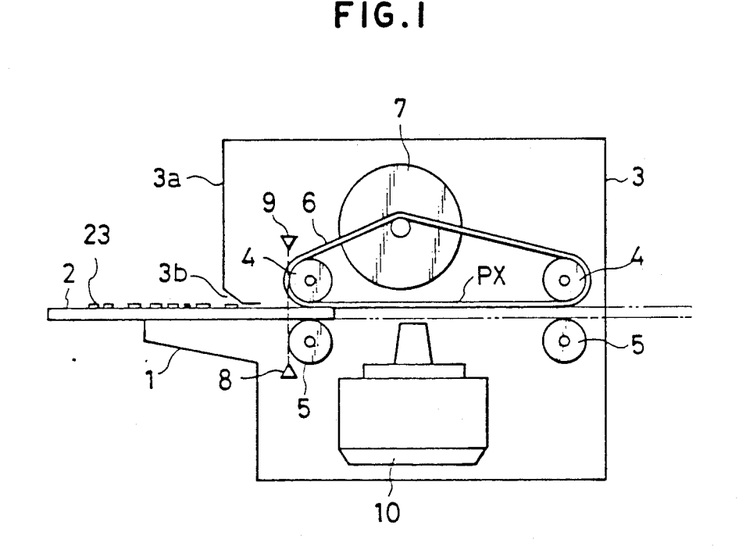
FIG. 1 is a schematic side view of an embossed card reader unit in an embodiment of the invention.

FIG. 1 shows a card reader unit 3 forming part of the embossed card processing apparatus according to this invention. The card reader unit 3 reads embossed characters (letters, marks and the like) formed on an embossed card Which has to be processed.

The reader unit 3 comprises a front panel 3a and a guide member 1 projecting horizontally outwardly through an opening 3b the front panel 3a. An embossed card 2 to be processed is placed on the guide member 1.

The embossed card 2 placed on the guide member 1 is guided into the body of the reader 3 by the action of conveyer rollers 4 and 6 which are disposed opposite to each other with respect to a card passage PX extending from the guide member 1. The rollers 4 are driven in forward and reverse directions by an electric motor 7 via a conveyer belt 6 which is run on the rollers 4 to convey the embossed card 2. In a preferred embodiment, the conveyer rollers 4 and 5 are made of a high friction material such as rubber.

The embossed card 2 with embossed characters 23 on the front surface thereof is guided through the opening 3b with the front surface facing upward. A light emitting diode 8 is located inside of the front panel 3a near the opening 3b and below the embossed card passage PX and a phototransistor 9 is located above the embossed card passage opposite to the light emitting diode 8 to receive the light from it. When the embossed card 2 is passed, the light from the light emitting diode 8 towards the phototransistor 9 is interrupted.

The reader unit 3 also comprises a sensing head 10 which is located beloW the card passage and between the rollers 5. The sensing head 10 is directed upward to leave a slight gap betWeen its tip and the lower (rear) surface of the embossed card 2 conveyed along the card passage PX.

Figure 2:
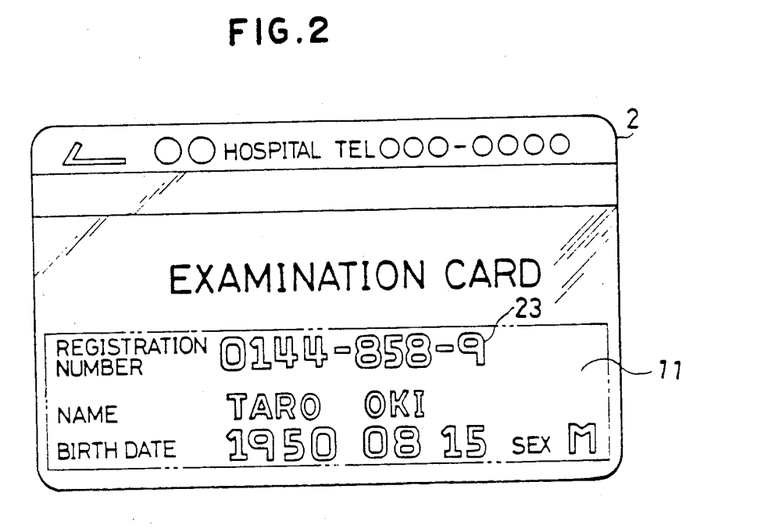
FIG. 2 shows a front surface of an example of embossed card which is a medical examination card to be processed by the reader unit shown in FIG. 1.

An example of an embossed card is shown in FIG. 2. This example is a medical examination card, used as an identification card for a patient. Formed by embossment in the embossment area 11 of the card are characters "0144-858-9", "TARO OKI", "1950 08 15", and "M" which respectively represent registration number, name, birth date, and sex of the patient. In addition, characters indicating the registration number, the name, the birth date and the sex are printed on the front surface of the card.

Figure 3:
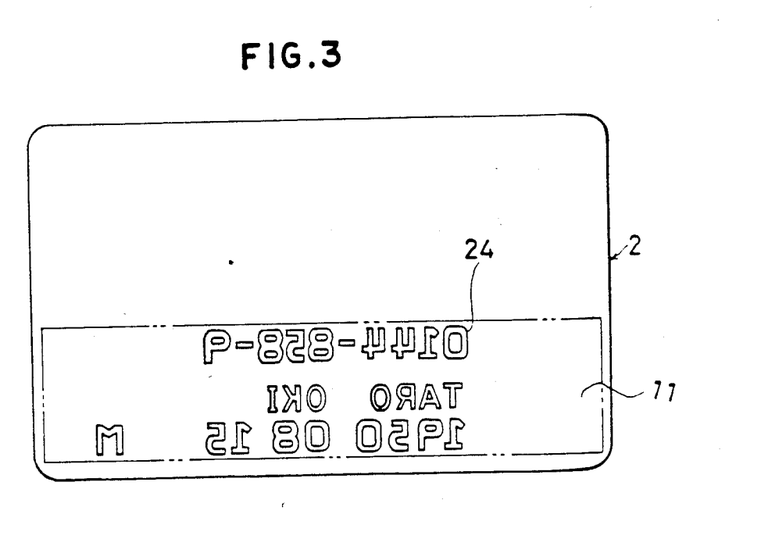
FIG. 3 shows a rear surface of the embossed card shown in FIG. 2.

On the rear surface of the embossed card, recesses 24 corresponding to the embossments are formed as shown in FIG. 3. The characters formed of the recesses are generally a mirror image (right-left reversed) of the embossed characters as seen on the front surface.

Figure 4:
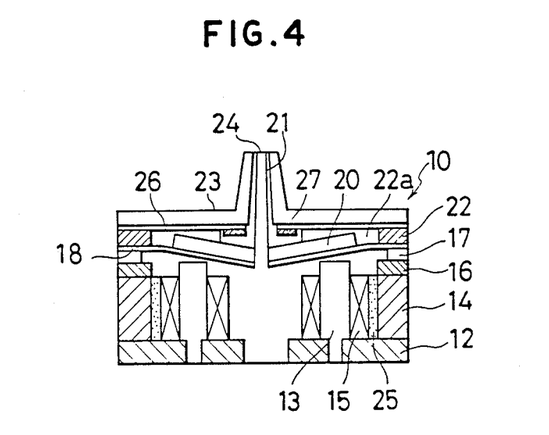
FIG. 4 is a sectional side view of a sensing head located in the reader unit shown in FIG. 1.
Figure 5:
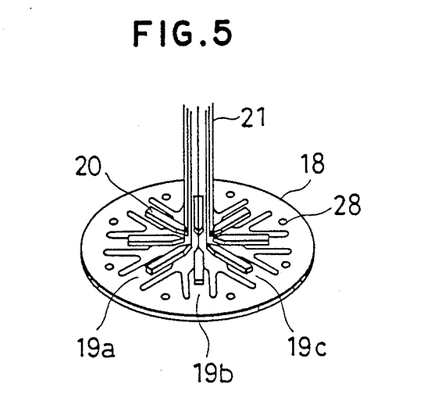
FIG. 5 is a perspective view of a sensing portion of the sensing head shown in FIG. 4.

FIG. 4 is a sectional view showing the internal structure of the sensing head 10 and FIG. 5 is a perspective view of part of the sensing head 10 shown in FIG. 4.

Referring to FIGS. 4 and 5, a number of cores 13 are secured onto the upper surface of a disk 12 constituting a common magnetic path, The number (N) of the cores 13 may be 7, 8, 9, ... In the illustrated embodiment, it is eight (N=8). Coils 15 are wound around the respective cores 13.

An annular permanent magnet 14 is also secured onto the upper surface of the first plate 12. An annular plate 16 is secured onto the upper surface of the annular permanent magnet 14.

A spacer 17 having a predetermined thickness is disposed between the annular plate 16 and a set of leaf springs 18 to ensure a desired gap therebetween. The entire set of leaf springs 18 are made of a single continuous sheet: it is blanked to have a plurality of centripetally extending parts called hammer parts $19a$ to $19n$ formed by division into radial (centripetal) segments. Each hammer part has one end effectivelY fixed to the annular plate 16 and acts as a leaf spring. Armatures 20 are secured to the respective hammer parts $19a$ to $19n$ and sensing wires 21 are connected to the inner ends of the respective armatures 20. The sensing wires 21 extend generally parallel with each other and in a first direction.

A yoke plate 22 which has protrusions 22a extending between adjacent armatures 20 forms a magnetic path between the permanent magnet 14 and the armatures 20. A guide frame 23 is layered on the yoke plate 22. Guide holes 24 are provided for guiding the sensing wires 21 so that the tips of the sensing wires 21 are disposed at different positions along a second direction orthogonal to the above first direction. A printed circuit board 26 is disposed between the yoke plate 22 and the guide frame 23 and piezoelectric provided elements 27 are located on the printed circuit board 26 at positions corresponding to the locations of the respective armatures 20 to detect the hammering impacts of armatures due to advancement of the sensing wires 21 exceeding a predetermined distance. An oil felt 25 is disposed between the permanent magnet 14 and the cores 13 for preventing rust.

The leaf spring set 18 is provided with a plurality of holes 28, as shown in FIG. 5, as are other members layered therewith, through which clamping bolts, not shown, are inserted to integrally secure such members.

When the embossed card 21 is inserted into the body of the reader 3 by an operator through the opening 3b of the front panel 3a, the embossed card 2 thus inserted interrupts the light emitted from the light emitting diode 8, and this is detected by the phototransistor 9.

The electric motor 7 is then driven by the action of a control unit, not shown, to convey the embossed card 2 into the body of the reader 3. The embossed card 2 Is conveyed along the card passage PX past the sensing head 10 in a third direction orthogonal to the first and the second directions.

The recesses 24 on the rear surface of the card 2 in the embossment area 11 are detected by hammering repeatedly as predetermined timings the embossment area 11 of the embossed card 2 with the sensing wires.

More specifically, when the coils 15 of the sensing head 10 are not energized, the armatures 20 are attracted to the cores 13 by means of the magnetic flux of the annular permanent magnet 14, so that the respective hammers 19a to 19n of the leaf spring 18 are held in a bent condition as shoWn in FIG. 4.

When the coils 15 are energized, the cores 13 around which the coils 15 are wound are magnetically excited thereby cancelling the magnetic flux of the permanent magnet 14, and accordingly, the hammers 19a to 19n return to the original state. Due to this returning action of the hammers 19a to 19n, the tips (front ends) of the sensing wires 21 secured to the armature 20 are moved toward the rear surface of the embossment area 11 of the card 2.

During this operation, some of armatures 20 corresponding to the sensing wires 21 proceeding in the recesses of the rear surface of the embossment area 11 of the card 2 collide with the respective piezoelectric elements 27, but the other armatures corresponding to the sensing wires 21 abutting against the portions other than the recesses of the embossment area 11 do not come into collision with the piezoelectric elements 27.

Figure 6A:
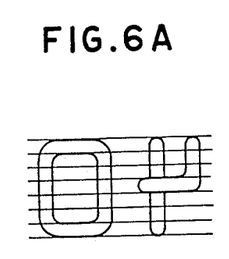
FIGS. 6A and 6B are diagrams used to explain the operation of the sensing head shown in FIG. 4 or FIG. 5.
Figure 6B:
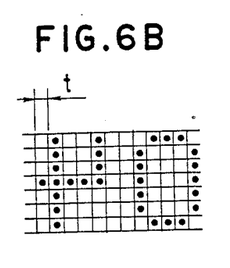

The collision of the armatures with the piezoelectric elements 27 is converted into variation in electrical signals. By detecting the electrical outputs of the piezoelectric elements 27, whether or not the respective sensing wires are confronting the recesses can be detected. The collection of such information accumulated as the embossed card is conveyed past the sensing head constitutes image data. This will be seen from FIGS. 6A and 6B. Specifically, FIG. 6A shows the rear surface of the embossed letters "04" as the registration number and FIG. 6B represents a result of the detection of the embossed letters "04" by means of the piezoelectric elements 27. This result shown in FIG. 6B is obtained by sensing the rear surface of the embossed card 2 with seven sensing wires 21 over a scanning timing t, and the result is given as binary data representing an image formed of a dot-matrix. The binary image data can be further processed for recognition of the characters by use of a character recognition unit, not shown.

In the embodiment described above, the embossed characters of the card 2 are read by detecting the recesses on the rear surface of the embossment area 11, so that the number of collisions of the armatures with the piezoelectric elements 27 can be reduced, and the accuracy in detection is improved.

After the reading of the embossed card 2, the electric motor 7 is driven in the reverse direction to convey the card 2 to the card insertion opening 3b along the guide member 1. When discharge of the card 2 has been confirmed by the operation of the light emitting diode 8 and light receiving transistor 9, the electric motor 7 stops and the embossed character reading process ends.

It will of course be understood that this invention is not limited to the above-described embodiment and various changes and modifications may be made as far as they do not depart from the scope of this invention.

For example, in the above embodiment, when only one line for the registration number is scanned by the sensing head the identification data including the registrant's personal name, birth date and sex which are stored beforehand can be derived. In a modification, a plurality of sensing heads be provided r single sensing head can be made movable across the direction to the travel of the embossed card, so as to permit reading of a plurality of lines of embossed characters.

In a further modification, the above described reading operation is performed by detecting the protrusions of the embossment on the front surface of the embossment area. In this case, the piezoelectric elements are not hit by the armatures at such points where the wires confront the protrusions. The values of the binary image data are reversed to those obtained when the recesses of the embossment are sensed. The patterns of the characters are not (left-right) reversed. A problem associated with these modifications is that along the edges of the patterns of characters, there are slope portions at which detection is not reliable.

As an alternative to the piezoelectric elements used for the detection of the collision of the wires with the surface of the embossed card, electric circuit contacts can be used.

The binary data thus obtained by reading are then transferred to the printing means and used for printing.

Figure 7:
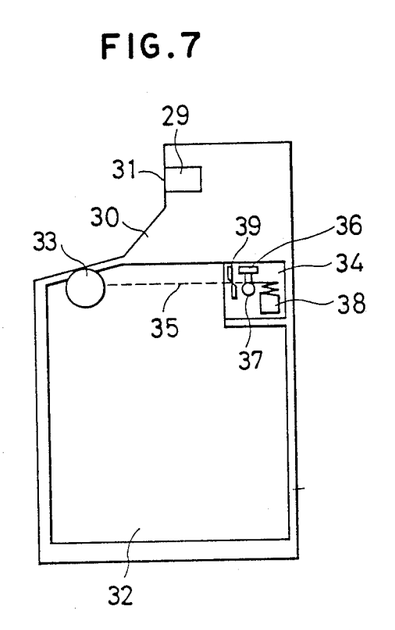
FIG. 7 is a schematic side view showing disposition of a card reader/writer, a printing unit and other components in an ATM.

FIG. 7 is a schematic side view showing the construction of the printing unit, which is incorporated in an automatic teller's machine (ATM).

In the construction of FIG. 7, reference numeral 29 designates a card reader/Writer comprising an embossment reader 3 and a magnetic head for reading from and writing into a magnetic strip on the card. Reference numeral 30 designates a customer panel provided with a card insertion opening 31 for the card reader/writer 29. The card insertion opening 31 of the example shown in FIG. 7 corresponds to the card insertion guide member 1 shown in FIG. I.

Reference numeral 32 designates a known bank notes processing machine which identifies and counts bank notes put into it. It also discharges bank notes designated by a customer from a container to pay the money. Reference numeral 33 designates a bank note receiving-/paying port arranged on the customer panel 30 and adapted to receive or pay bank notes as well as to discharge receipts therethrough.

A printer unit 34 is mounted to the rear portion of the bank note processing machine 32, for printing a receipt. It is provided with a receipt paper conveying passage 35 connected to the bank note receiving/paying port 33, a printing head 36 having printing elements arranged linearly across and above the receipt paper conveying passage 35. The printing head 36 has the same resolving power as that of the sensing head 10. More specifically, the printing elements of the printing head 36 are associated in one-to-one relationship with the sensing wires of the sensing head and disposed at positions corresponding to the positions of the associated wires, and the output signal obtained from action of each sensing wire is used to drive the associated printing element. A platen roller 37 is positioned opposite the printing head 36. The printer unit 34 further comprises a receipt paper container 88 for accommodating unprinted receipt paper, and a cutter 39 for cutting the receipt paper into a piece of receipt after printing. The bank note conveying passage may be also used as the receipt paper conveying passage 35 of the printing unit 34.

The printing head 36 of the type described above is a known spring-charged dot-matrix printing head, and is fundamentally of the same construction as the sensing head 10, particularly, in the numbers of the wires, a diameter of the wire, and pitch between the wires, and the same resolving power. As a result, a circuit for data conversion and a printed circuit board for such a circuit need not be used or mounted.

Moreover, according to this invention, since it is not necessary to convey the embossed card to a printing unit, the restriction on the location of the printing unit has been removed: the printer 34 need not be mounted near the card insertion opening 31. As a result, the printer 34 can be located in any available space, e.g., at the rear portion of the bank note processing machine, the space having been unused for other purposes. Replenishment of the receipt paper is thereby facilitated.

The printer 34, according to the construction described above, prints information concerning the details of the transaction, data or the like on the receipt paper by the action of the printing head 36, and also prints an image of the embossment by receiving the binary data of the embossment area 11 read by the sensing head 10.

An electric control system for the above embodiment will next be described with reference to FIG. 8.

The card reader/writer 29 is connected through a card reader/writer control unit 41 to an ATM control unit 40 built into the apparatus. The card reader/writer 29 comprises a magnetic writer element 42 adapted to write the information on the magnetic strip on the embossed card 2 by means of a magnetic head, a magnetic reader element 43 adapted to read the information from the magnetic strip, and a sensing head 44 adapted to read embossed characters by means of the sensing wires 21 to output binary signals.

The printing head 36 of the printer 34 shown in FIG. 7 is controlled by a printer controller 45 connected to the ATM control unit 40.

Figure 8:
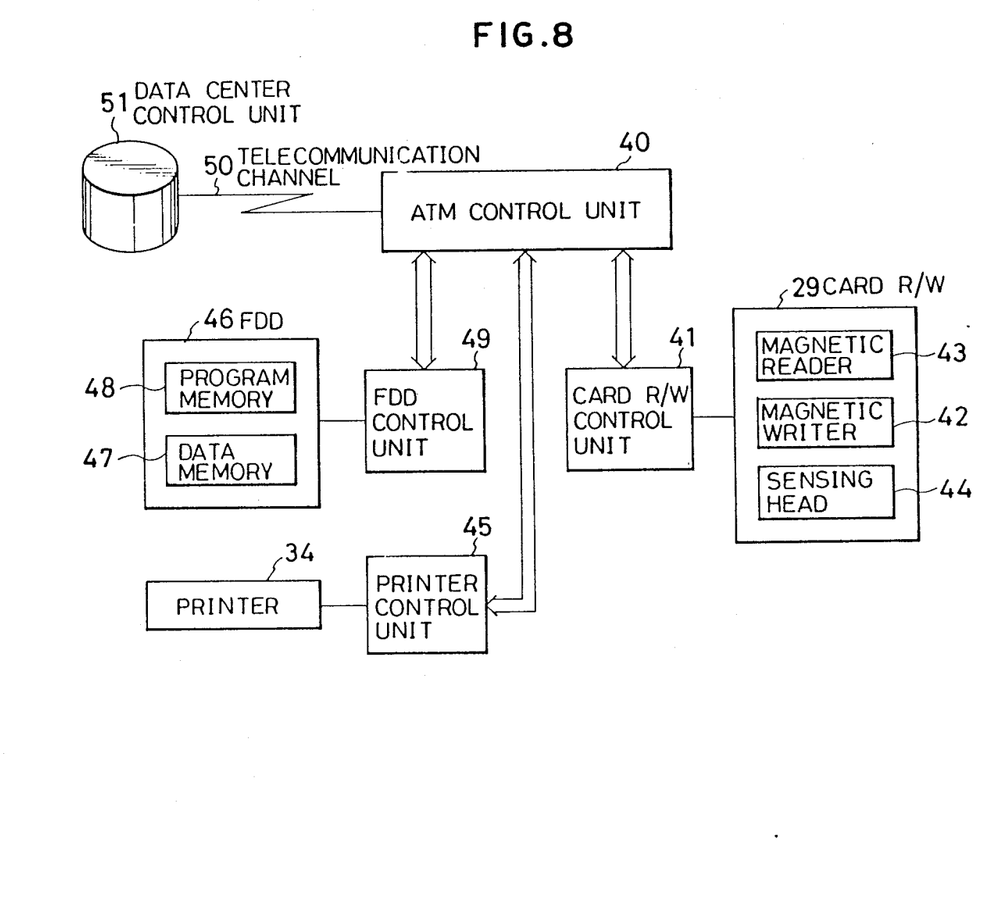
FIG. 8 is a block diagram of an embodiment of a control system according to this invention.

A floppy disc drive (FDD) 46 shown in FIG. 8 comprises a data memory 47 for storing the binary data of the embossed characters formed by the card reader/writer control unit 41 and a program memory 48 for storing a program controlling the operations of the whole apparatus. The FDD 46 is controlled by an FDD control unit 49 connected to the ATM control unit 40, which in turn is connected to a data center control unit 51 through a telecommunication channel 50.

The embodiment shown in FIG. 8 operates in the following manner.

When an embossed card 2 is inserted into the card reader/writer 29, the information concerning a pass word, an account number, or the like magnetically recorded on the embossed card 2 is read out by the magnetic reader 43, and the information thus read is then transferred to the data center control unit 51 through the card reader/writer control unit 41, the ATM control unit 40, and the telecommunication channel 50 in this sequence.

The embossment area of the card 2 are subsequently scanned by the sensing head 44 in accordance with the afore-mentioned sensing operation and the electric signals from the piezoelectric element are sent to the card reader/writer unit 41, where they are reconstructed into image data of the dot-matrix form representing the image of the embossed characters. The dot-matrix data thus formed are stored in the data memory 47 of the FDD 46 through the ATM control unit 40 and the FDD control unit 49.

Thereafter, various processing such as processing of money receipt, processing of moneY payment, remittance recording on a bankbook, or the like are performed.

When it is so required, information is written on the magnetic strip of the embossed card 2 from the data center control unit 51 shown in FIG. 8 through the telecommunication channel 50, the ATM control unit 40, the card reader/writer control unit 49, the magnetic writer element 42, and a maGnetic head, not shown. The embossed card 2 is thereafter conveyed to the card insertion opening 31 for return to the customer.

The image data concerning the embossed characters of the card 2 stored in the data memory 47 of the FDD 46 are printed on the receipt paper fed from the receipt paper container 38, sent through the FDD control unit 46, the ATM control unit 40, the printer control unit 45, and the printing head 36 of the printer 34, where printing in accordance with the image data is performed with the same resolving power as the sensing (image reading) of the sensing head 10. According to these operations, the details of the transaction, date of the transaction, and the like are printed in accordance with the information from the central control unit 81. After the printing the receipt paper is cut by means of the cutter 39, and the receipt out into a short piece is conveyed through the receipt conveying passage 35 to the bank note handling unit 33 for delivery to the customer.

The data concerning the embossed characters of the card 2 are stored in the data memory 47 of the FDD 46 for future refence, e.g., examination. The above arrangement eliminates the need of preserving journals, so that the journal take-up mechanism for the printer 34 can be eliminated, and in addition, apart from the receipt given to the customer, no copies (such as ones for preservation at the bank) are needed, so that the capacity for storing unprinted receipt paper can also be reduced.

The data stored in the data memory 47 can be used not only for the inspection or examination afterwards in place of a conventional journal, but also for other processings in the various units in the system controlled by the data center control unit 51. For this purpose, the data can be transferred through the FDD control unit 49, the ATM control unit 40 and the telecommunication channel 50, to the data center control unit 51, and then transferred to various devices in the system.

In the foregoing description, this invention is applied to a transaction processing system in a financial agency such as a bank, but it is to be understood that this invention is not limited to the embodiment described and is applicable to various systems such as examination card processing system for use in a hospital, credit card processing system for use in a store, or the like in which information is transferred and stored using embossed cards.

As described in detail above, according to this invention, mechanical sensings are made by means of sensing wires. Electrical signals indicating whether or not the sensing wires have collided with the card surface are produced. Image data formed of a dot matrix are produced. Where printing elements are provided each in association with one sensing wire, data obtained from action of each wire is used for directly driving the associated printing element. This arrangement simplifies the circuit configuration for data processing.

The data can be stored for future reference. This will eliminate preservation of data on recording paper or journals. The data may be used for character recognition as well.

The printer can be disposed at any place. It need not be located near the card insertion opening. For instance, in the application to an ATM, a receipt paper container can be disposed at a rear portion of the ATM, apart from a card reader/writer so that replenishment of the receipt paper is facilitated.

What is claimed is:

1. Apparatus for processing embossed characters on an embossed card comprising:
    a sensing head having sensing wires extending generally parallel with each other in a first direction, the tips of said sensing wires being disposed at different positions along a second direction orthogonal to said first direction;
    means for repeatedly actuating said sensing wires toward their tips;
    means for detecting advancement of each sensing wire exceeding a predetermined distance, and for producing an electrical signal indicating the result of detection, said detecting means comprising a piezoelectric element disposed to be compressed when the sensing wire advances said predetermined distance; and
    means for causing relative movement between the sensing head and the embossed card in a third direction orthogonal to said first and second directions, with the surface of the embossed card being held parallel with said second and third directions, and close to the tips of said sensing wires, such that the tip of each sensing wire hits or does not hit the surface of the embossed card before exceeding said predetermined distance depending on whether or not the sensing wire is confronting an embossment or not, the collection of the electrical signals produced by said detecting means forming an image signal representing the embossments.

2. An apparatus according to claim 1, wherein said means for causing relative movement comprises a conveyor conveying said embossed card past said sensing head.

3. Apparatus according to claim 1, further comprising a printer having print elements respectively associated with sensing wires of said sensing head, and means driving each print element in accordance with an electric signal obtained by detection of the advancement of the associated sensing wire.

4. Apparatus according to claim 3, wherein said electrical signal is a binary signal indicating whether or not the sensing wire has advanced exceeding said predetermined distance.

5. Apparatus according to claim 3, wherein said print elements are disposed at positions corresponding to the associated sensing wires.

6. Apparatus according to claim 5, wherein said printer further comprises means for causing relative movement between printing paper and the print head, and said print elements are disposed at different positions along a direction orthogonal to the direction of said relative movement.

7. Apparatus for processing embossed characters on an embossed card comprising:
    a sensing head having sensing wires extending generally parallel with each other in a first direction, the tips of said sensing wires being disposed at different positions along a second direction orthogonal to said first direction, said sensing head including;
    armatures respectively supporting said sensing wires;
    an annular member;
    leaf springs fixed at one end to said annular member, said leaf springs extending centripetally toward each other and supporting, at another end, respective armatures; and
    means for electromagnetically applying a force to said armature and releasing it to permit movement by the action of said leaf spring to cause advancement and return of said sensing wire;
    means for repeatedly actuating said sensing wires toward their tips;
    means for detecting advancement of each sensing wire exceeding a predetermined distance, and for producing an electrical signal indicating the result of detection; and
    means for causing relative movement between the sensing head and the embossed card in a third direction orthogonal to said first and second directions, with the surface of the embossed card being held parallel with said second and third directions, and close to the tips of said sensing wires, such that the tip of each sensing wire hits or does not hit the surface of the embossed card before exceeding said predetermined distance depending on whether or not the sensing wire is confronting an embossment or not, the collection of the electrical signals produced by said detecting means forming an image signal representing the embossments.

8. An apparatus according to claim 7, wherein said means for causing relative movement comprises a conveyor conveying said embossed card past said sensing head.

9. Apparatus according to claim 7, further comprising a printer having print elements respectively associated with sensing wires of said sensing head, and means driving each print element in according with an electric signal obtained by detection of the advancement of the associated sensing wire.

10. Apparatus according to claim 9, wherein said electrical signal is a binary signal indicating whether or not the sensing wire has advanced exceeding said predetermined distance.

11. Apparatus according to claim 9, wherein said print elements are disposed at positions corresponding to the associated sensing wires.

12. Apparatus according to claim 11, wherein said printer further comprises means for causing relative movement between printing paper and the print head, and said print elements are disposed at different positions along a direction orthogonal to the direction of said relative movement.

* * * * *